(12) United States Patent
Hanna

(10) Patent No.: US 12,703,495 B2
(45) Date of Patent: Aug. 11, 2026

(54) SYSTEMS AND METHODS FOR CONTROLLING AN ELECTRIC MOTOR OF AN AIRCRAFT PROPULSION SYSTEM

(71) Applicant: Pratt & Whitney Canada Corp., Longueuil (CA)

(72) Inventor: Michael Hanna, Beaconsfield (CA)

(73) Assignee: Pratt & Whitney Canada Corp., Longueuil (CA)

( * ) Notice: Subject to any disclaimer, the term of this patent is extended or adjusted under 35 U.S.C. 154(b) by 111 days.

(21) Appl. No.: 18/759,078

(22) Filed: Jun. 28, 2024

(65) Prior Publication Data

US 2026/0001653 A1 Jan. 1, 2026

(51) Int. Cl.
*B64D 27/34* (2024.01)
*B64D 27/357* (2024.01)
*B64D 31/16* (2024.01)

(52) U.S. Cl.
CPC ........... *B64D 27/34* (2024.01); *B64D 27/357* (2024.01); *B64D 31/16* (2024.01); *B64D 2221/00* (2013.01)

(58) Field of Classification Search
CPC ...... B64D 27/34; B64D 27/357; B64D 31/16; B64D 2221/00
See application file for complete search history.

(56) References Cited

U.S. PATENT DOCUMENTS 7,332,884 B2 2/2008 Rozman
9,914,536 B2 3/2018 Rossotto
11,437,813 B2 9/2022 Dougherty
11,697,355 B2 7/2023 Haputhanthri
11,794,916 B2 10/2023 Mark
12,009,742 B1 * 6/2024 Ittamveettil ............ B64D 27/33
2006/0174143 A1 * 8/2006 Sawyers ................. G06F 1/263
713/300

(Continued)

FOREIGN PATENT DOCUMENTS

WO 2023041382 A1 3/2023

OTHER PUBLICATIONS

EP Search Report for EP Patent Application No. 25186436.9 dated Oct. 31, 2025.

*Primary Examiner* — Donald J Wallace
*Assistant Examiner* — Jalal C Coduroglu
(74) *Attorney, Agent, or Firm* — Getz Balich LLC

(57) ABSTRACT

A propulsion system for an aircraft includes a propulsor, an engine, an electrical assembly, and a control unit. The engine includes a rotational assembly. The rotational assembly is coupled to the propulsor. The electrical assembly includes an electric motor, an electrical distribution system, and an electrical current sensor. The electric motor is coupled to the propulsor. The electric motor is electrically connected to the electrical distribution system. The electrical current sensor is configured to measure an electrical current supplied to the electric motor by the electrical distribution system. The control unit is configured to identify a power lever angle of a power throttle for the propulsion system is greater than or less than a power threshold, identify the electrical current is greater than or less than an electrical current threshold in response to identifying the power lever angle is less than the power threshold, and disable the electric motor in response to identifying the electrical current is greater than the electrical current threshold.

19 Claims, 4 Drawing Sheets

(56) References Cited

U.S. PATENT DOCUMENTS

| | | | | |
|---|---|---|---|---|
| 2015/0318806 | A1* | 11/2015 | Wai | H02P 6/10 318/400.23 |
| 2016/0236790 | A1* | 8/2016 | Knapp | B64D 27/24 |
| 2021/0096162 | A1 | 4/2021 | Langlet | |
| 2021/0317790 | A1* | 10/2021 | Ziolkowski | F02C 9/46 |
| 2022/0009615 | A1 | 1/2022 | Mark | |
| 2022/0094297 | A1* | 3/2022 | Lacaux | B64D 27/357 |
| 2022/0234748 | A1 | 7/2022 | Mark | |
| 2022/0402364 | A1* | 12/2022 | Khozikov | B60L 3/04 |
| 2023/0011896 | A1 | 1/2023 | Serr | |
| 2023/0137815 | A1* | 5/2023 | Evans | F02C 7/262 60/39.281 |
| 2023/0150637 | A1* | 5/2023 | Afman | G05G 9/047 701/21 |
| 2024/0084710 | A1* | 3/2024 | Trainer | H02P 9/00 |
| 2024/0113513 | A1* | 4/2024 | Syed | F02C 9/48 |
| 2024/0425187 | A1* | 12/2024 | Gharagozloo | B64D 27/34 |

* cited by examiner

SYSTEMS AND METHODS FOR CONTROLLING AN ELECTRIC MOTOR OF AN AIRCRAFT PROPULSION SYSTEM

TECHNICAL FIELD

This disclosure relates to systems and methods for controlling an electric motor of an aircraft propulsion system.

BACKGROUND OF THE ART

Hybrid-electric propulsion system architectures for aircraft may typically include one or more engines (e.g., gas turbine engines) and one or more electric motors configured to facilitate aircraft propulsion. Various control systems and methods for controlling operation of the electric motor(s) of a hybrid-electric propulsion system are known. While these known control systems and methods may be suitable for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a propulsion system for an aircraft includes a propulsor, an engine, an electrical assembly, and a control unit. The engine includes a rotational assembly configured for rotation about a rotational axis of the engine. The rotational assembly is coupled to the propulsor. The electrical assembly includes an electric motor, an electrical distribution system, and an electrical current sensor. The electric motor is coupled to the propulsor. The electric motor is electrically connected to the electrical distribution system. The electrical current sensor is configured to measure an electrical current supplied to the electric motor by the electrical distribution system. The control unit includes a processor connected in signal communication with a non-transitory memory including instructions which, when executed by the processor, cause the processor to identify a power lever angle of a power throttle for the propulsion system is greater than or less than a power threshold, identify the electrical current is greater than or less than an electrical current threshold in response to identifying the power lever angle is less than the power threshold, and disable the electric motor in response to identifying the electrical current is greater than the electrical current threshold.

In any of the aspects or embodiments described above and herein, the control unit may be connected in signal communication with the electric motor, and disabling the electric motor may include commanding the electric motor, with the control unit, to deenergize the electric motor.

In any of the aspects or embodiments described above and herein, disabling the electric motor may include controlling the electrical distribution system, with the control unit, to electrically isolate the electric motor.

In any of the aspects or embodiments described above and herein, the electrical distribution system may include a contactor connected in signal communication with the control unit. The contactor may be configurable in a closed condition or an open condition. In the closed condition the contactor may be configured to supply electrical power to the electric motor from the electrical distribution system. In the open condition the contactor may be configured to electrically isolate the electric motor from the electrical distribution system. Controlling the electrical distribution system to electrically isolate the electric motor may include controlling the contactor, with the control unit, from the closed condition to the open condition.

In any of the aspects or embodiments described above and herein, the electrical assembly includes a battery, and the battery is electrically connected to the electric motor by the electrical distribution system.

In any of the aspects or embodiments described above and herein, the electrical assembly may include a battery management system for the battery. The battery management system may include the control unit.

In any of the aspects or embodiments described above and herein, the battery management system may include a battery sensor assembly for the battery. The control unit may be connected in signal communication with the battery sensor assembly.

In any of the aspects or embodiments described above and herein, the propulsion system may include a gear box coupling the propulsor to the rotational assembly and the electric motor.

According to another aspect of the present disclosure, a method for controlling an electric motor of a propulsion system for an aircraft includes driving rotation of a propulsor with an engine of the propulsion system in response to a power lever angle of a power throttle for the propulsion system, identifying, with a control unit, the power lever angle is less than a power threshold, identifying, with the control unit, an electrical current supplied to an electric motor of the propulsion system from an electrical distribution system is greater than an electrical current threshold in response to identifying the power lever angle is less than the power threshold, and disabling, with the control unit, the electric motor in response to identifying the electrical current is greater than the electrical current threshold. The electric motor is coupled to the propulsor.

In any of the aspects or embodiments described above and herein, disabling the electric motor may include commanding the electric motor, with the control unit, to deenergize the electric motor.

In any of the aspects or embodiments described above and herein, disabling the electric motor may include controlling the electrical distribution system, with the control unit, to electrically isolate the electric motor.

In any of the aspects or embodiments described above and herein, the electrical distribution system may include a contactor connected in signal communication with the control unit. The contactor may be configurable in a closed condition or an open condition. In the closed condition the contactor may be configured to supply electrical power to the electric motor from the electrical distribution system. In the open condition the contactor is configured to electrically isolate the electric motor from the electrical distribution system. Controlling the electrical distribution system to electrically isolate the electric motor may include controlling the contactor, with the control unit, from the closed condition to the open condition.

In any of the aspects or embodiments described above and herein, the steps of identifying the power lever angle is less than the power threshold, identifying the electrical current supplied to the electric motor is greater than the electrical current threshold, and disabling the electric motor may be performed while driving rotation of the propulsor with the engine.

In any of the aspects or embodiments described above and herein, the steps of identifying the power lever angle is less than the power threshold, identifying the electrical current supplied to the electric motor is greater than the electrical current threshold, and disabling the electric motor may be performed during a landing sequence of the aircraft.

In any of the aspects or embodiments described above and herein, the propulsion system may include a gear box coupling the propulsor to the rotational assembly and the electric motor.

According to another aspect of the present disclosure, a propulsion system for an aircraft includes a propulsor, an engine, and an electrical assembly. The engine includes a rotational assembly configured for rotation about a rotational axis of the engine. The rotational assembly is coupled to the propulsor. The electrical assembly includes an electric motor, an electrical distribution system, a battery, a battery management system, and an electrical current sensor. The electric motor is coupled to the propulsor. The electric motor and the battery are electrically connected to the electrical distribution system. The electrical current sensor is configured to measure an electrical current supplied to the electric motor by the electrical distribution system. The battery management system includes a battery sensor assembly for the battery. The battery management system further includes a processor connected in signal communication with a non-transitory memory including instructions which, when executed by the processor, cause the processor to identify a power lever angle of a power throttle for the propulsion system is greater than or less than a power threshold, identify the electrical current is greater than or less than an electrical current threshold in response to identifying the power lever angle is less than the power threshold, and disable the electric motor in response to identifying the electrical current is greater than the electrical current threshold.

In any of the aspects or embodiments described above and herein, the battery management system may be connected in signal communication with the electric motor. Disabling the electric motor may include commanding the electric motor, with the battery management system, to deenergize the electric motor.

In any of the aspects or embodiments described above and herein, disabling the electric motor may include controlling the electrical distribution system, with the battery management system, to electrically isolate the electric motor.

In any of the aspects or embodiments described above and herein, the electrical distribution system may include a contactor connected in signal communication with the battery management system. The contactor may be configurable in a closed condition or an open condition. In the closed condition, the contactor may be configured to supply electrical power to the electric motor from the electrical distribution system. In the open condition, the contactor may be configured to electrically isolate the electric motor from the electrical distribution system. Controlling the electrical distribution system to electrically isolate the electric motor may include controlling the contactor, with the battery management system, from the closed condition to the open condition.

In any of the aspects or embodiments described above and herein, the propulsion system may include a gear box coupling the propulsor to the rotational assembly and the electric motor.

The present disclosure, and all its aspects, embodiments and advantages associated therewith will become more readily apparent in view of the detailed description provided below, including the accompanying drawings.

DETAILED DESCRIPTION

Figure 1:
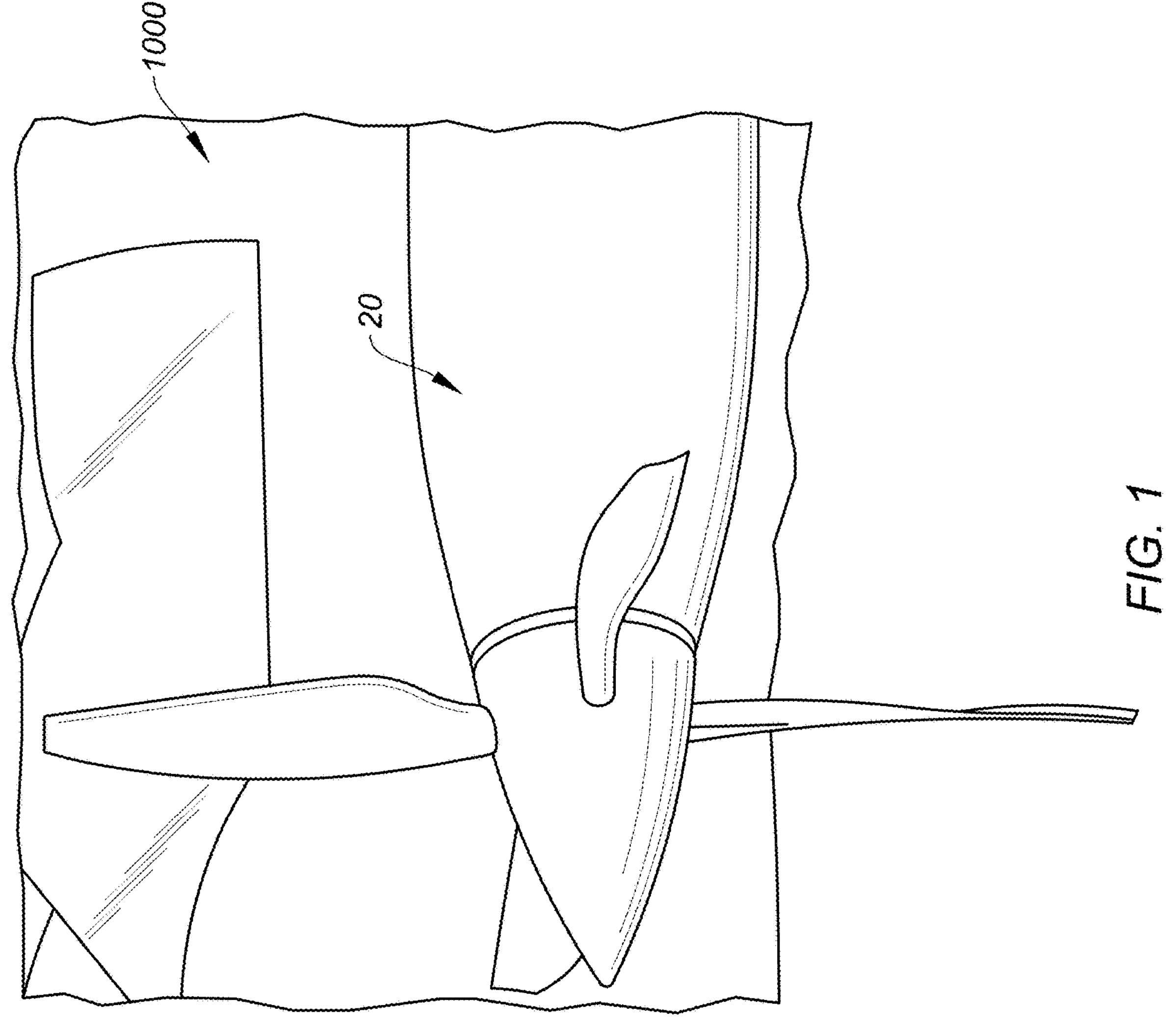
FIG. 1 illustrates an aircraft including a propulsion system, in accordance with one or more embodiments of the present disclosure.

FIG. 1 illustrates an aircraft 1000 including at least one propulsion system 20. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone). The propulsion system 20 of FIG. 1 is a hybrid-electric propulsion system including an engine 22, an electrical assembly 24, and a propulsor 28.

Figure 2:
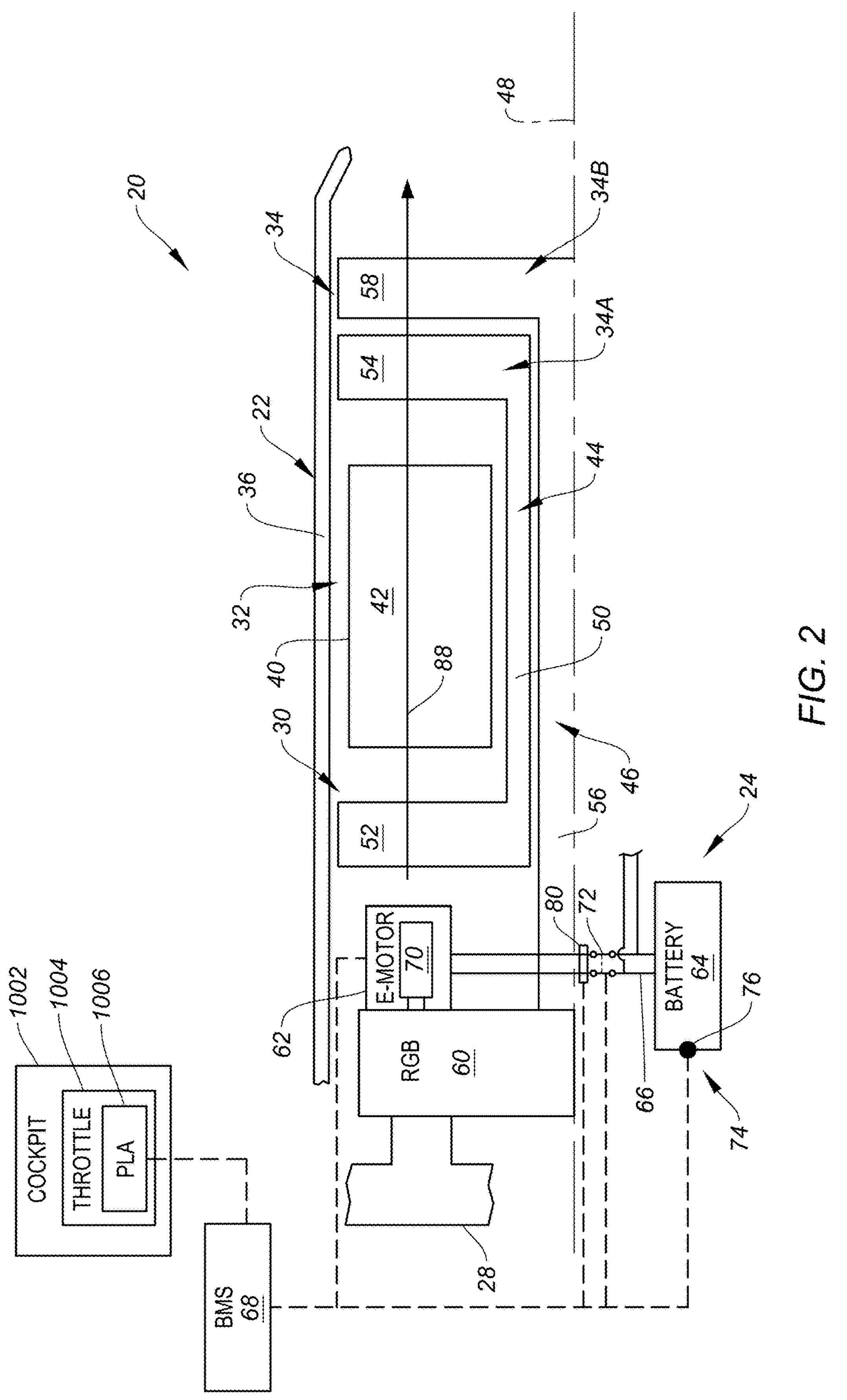
FIG. 2 schematically illustrates a cutaway, side view of an aircraft propulsion system, in accordance with one or more embodiments of the present disclosure.

FIG. 2 schematically illustrates a cutaway, side view of the propulsion system 20. The engine 22 of FIG. 2 is configured as a turboprop gas turbine engine. However, the present disclosure is not limited to any particular configuration of gas turbine engine for the propulsion system 20, and examples of gas turbine engine configurations for the propulsion system 20 may include, but are not limited to, a turbofan engine, a turbojet engine, a propfan engine, or the like. Moreover, the present disclosure is not limited to propulsion systems including a gas turbine engine. For example, the engine 22 may alternatively be configured as an intermittent combustion engine such as, but not limited to, a rotary engine (e.g., a Wankel engine), a piston engine, or the like.

The engine 22 of FIG. 2 includes a compressor section 30, a combustor section 32, a turbine section 34, and an engine static structure 36. The combustor section 32 includes a combustor 40 (e.g., an annular combustor). The combustor 40 forms a combustion chamber 42. The turbine section 34 includes a high-pressure turbine section 34A and a power turbine section 34B.

Components of the compressor section 30 and the turbine section 34 of FIG. 2 form a first rotational assembly 44 (e.g., a high-pressure spool) and a second rotational assembly 46 of the engine 22. The first rotational assembly 44 and the second rotational assembly 46 are mounted for rotation about a rotational axis 48 (e.g., an axial centerline) of the engine 22 relative to the engine static structure 36.

The first rotational assembly 44 includes a first shaft 50, a bladed compressor rotor 52 for the compressor section 30, and a bladed turbine rotor 54 for the high-pressure turbine section 34A. The first shaft 50 interconnects the bladed compressor rotor 52 and the bladed turbine rotor 54.

The second rotational assembly 46 of FIG. 2 includes a second shaft 56 and a bladed power turbine rotor 58 for the power turbine section 34B. The second shaft 56 is connected to the bladed power turbine rotor 58. The second shaft 56 operably connects (e.g., directly or indirectly connects) the bladed power turbine rotor 58 with the propulsor 28.

The engine static structure 36 includes engine casings, cowlings, and other fixed (e.g., non-rotating) structures of the engine 22 which house and/or support components of the engine 22 such as, but not limited to, those of the compressor section 30, the combustor section 32, and the turbine section 34. The engine static structure 36 includes one or more bearing assemblies and/or gear trains configured to rotationally support and/or interconnect components of the first rotational assembly 44 and the second rotational assembly 46. The engine static structure 36 of FIG. 2 includes a gear box 60 coupling the second shaft 56 and the propulsor 28. For example, the gear box 60 includes a gear assembly (e.g., an epicyclic gear assembly) coupling the second shaft 56 and the propulsor 28. The gear assembly may be a reduction gear assembly configured to drive rotation of the propulsor 28 at a reduced rotational speed relative to the second shaft 56. Of course, the second shaft 56 may alternatively be directly connected to the propulsor 28 to drive the propulsor 28 at the same rotational speed as the second shaft 56.

The electrical assembly 24 of FIG. 2 includes an electric motor 62, a battery 64, an electrical distribution system 66, and a battery management system (BMS) 68.

The electric motor 62 is electrically connected to the electrical distribution system 66. The electric motor 62 includes a rotor 70. The rotor 70 is coupled to the propulsor 28 by the gear box 60. For example, the gear box 60 may couple both of the second shaft 56 and the rotor 70 to the propulsor 28 to facilitate driving rotation of the propulsor 28 with the bladed power turbine rotor 58 (e.g., via the second shaft 56), the electric motor 62 (e.g., the rotor 70), or a combination of the bladed power turbine rotor 58 and the electric motor 62. The electric motor 62 may additionally include a motor control unit (e.g., an inverter) configured to control electric power characteristics (e.g., frequency, voltage, current) supplied to the electric motor 62 (e.g., windings of the electric motor 62), for example, to control a rotation speed and/or torque of the rotor 70.

The battery 64 is electrically connected to the electrical distribution system 66. The battery 64 is configured to selectively supply electrical power to the electrical distribution system 66 independently (e.g., as a single power source for the electrical assembly 24) or in combination with one or more other electrical power sources (e.g., an electrical generator). The battery 64 may include a plurality of battery modules (e.g., battery packs), battery cells, and/or the like electrically connected together in series and/or parallel as necessary to configure the battery 64 with the desired electrical characteristics (e.g., voltage output, current output, storage capacity, etc.). The present disclosure is not limited to any particular configuration of the battery 64. The battery 64 (e.g., and its battery cells) may be configured as a rechargeable battery having a battery chemistry such as, but not limited to, lead acid, nickel cadmium (NiCd), nickel-metal hydride (Ni—MH), lithium-ion (Li-ion), lithium-polymer (Li-poly), lithium metal, and the like.

The electrical distribution system 66 electrically connects components of the electrical assembly 24. The electrical distribution system 66 includes switchgear, cables, wires, breakers, switches, electrical power conditional and/or conversion (e.g., AC to DC or DC to AC conversion) components, and/or other electrical components to effect the transfer of electrical power between components of the electrical assembly 24. For example, the electrical distribution system 66 of FIG. 2 electrically connects the electric motor 62 with the battery 64 and other electric power sources (e.g., an electrical generator) of the electrical assembly 24. The electrical distribution system 66 of FIG. 2 includes a contactor 72. The contactor 72 is selectively configurable in a closed condition or an open condition. The contactor 72 in the closed condition electrically connects the electric motor 62 with electrical power sources of the electrical assembly 24 (e.g., the battery 64, an electrical generator, etc.). The contactor 72 in the open condition electrically isolates the electric motor 62 from these electrical power sources. The electrical distribution system 66 may additionally include one or more electrical power controllers, for example, to control a magnitude and/or direction of electrical current flow to components of the electrical assembly 24. The electrical distribution system 66 is configured to supply electrical power to electrical loads of the aircraft 1000, the propulsion system 20, and/or the engine 22.

The battery management system 68 is configured to monitor conditions of the battery 64 (e.g., state of charge, state of health, temperature, etc.) and to control battery 64 functions (e.g., cell and/or module power distribution, thermal management, cell balancing, battery charging, etc.). The battery management system 68 includes and is connected in signal communication with a battery sensor assembly 74. The battery sensor assembly 74 includes a plurality of battery sensors 76. The battery sensors 76 include sensors such as, but not limited to, voltage sensors, temperature sensors, coolant temperature and/or flow sensors, current sensors, and the like for the battery 64. The battery management system 68 may additionally include and/or be connected in signal communication with one or more electric motor sensors for the electric motor 62. For example, the electrical assembly 24 of FIG. 2 includes a current sensor 80 configured to measure an electrical current flow supplied to the electric motor 62 by the electrical distribution system 66. Alternatively, the battery management system 68 may be configured to receive measurements of the electrical current flow supplied to the electric motor 62 from one or more other control systems (e.g., an electronic engine controller (EEC), a motor control unit (MCU), etc.).

Figure 3:
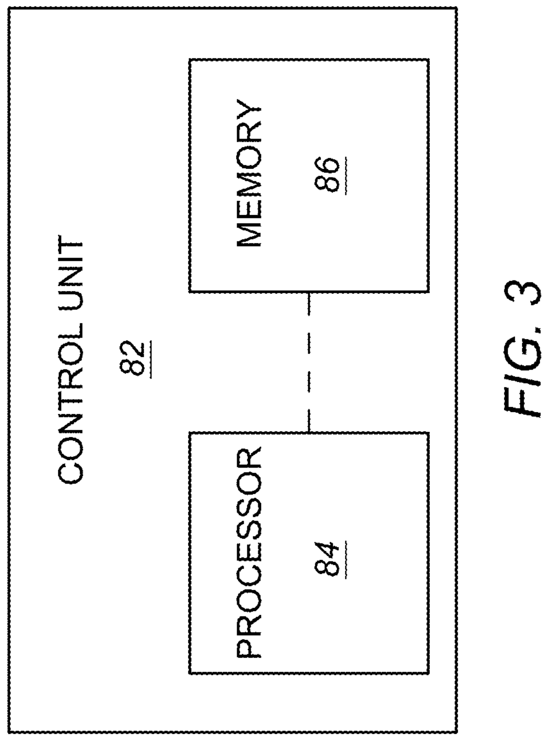
FIG. 3 illustrates a control unit for an aircraft propulsion system control assembly, in accordance with one or more embodiments of the present disclosure.

The battery management system 68 includes a control unit 82. FIG. 3 schematically illustrates the control unit 82. The control unit 82 includes a processor 84 connected in signal communication with memory 86. The processor 84 may include any type of computing device, computational circuit, processor(s), central processing unit (CPU), graphics processing unit (GPU), computer, or the like capable of executing a series of instructions that are stored in memory 86. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the control unit 82 to accomplish the same algorithmically and/or coordination of electrical assembly 24 components including, but not limited to, the electric motor 62, the battery 64, the electric distribution system 66, and/or the battery management system 68. The memory 86 may include a single memory device or a plurality of memory devices (e.g., a computerreadable storage device that can be read, written, or otherwise accessed by a general purpose or special purpose computing device, including any processing electronics and/or processing circuitry capable of executing instructions). The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly and/or indirectly coupled to the control unit 82. The control unit 82 may include, or may be in communication with, a user interface including one or more inputs devices and/or one or more output devices, for example, an input device that enables a user to enter data and/or instructions and an output device configured to display information (e.g., a visual display or a printer), or to transfer data, etc. Communications between the control unit 82 and external electrical or electronic devices (e.g., the electric motor 62, the contactor 72, the battery sensor assembly 74, the electric motor sensors 78, and/or the current sensor 80) may be via a hardwire connection or via a wireless connection. A person of skill in the art will recognize that portions of the control unit 82 may assume various forms (e.g., digital signal processor, analog device, etc.) capable of performing the functions described herein.

The battery management system 68 (e.g., the control unit 82) may be connected in signal communication with a cockpit control system 1002 of the aircraft 1000. In particular, the battery management system 68 may be connected in signal communication with a power throttle 1004 of the cockpit control system 1002. The power throttle 1004 may be configured as an angularly displaceable power lever or a collective lever which defines a power lever angle (PLA) 1006 or throttle lever angle representative of a power request (e.g., by a pilot or other operator for the propulsion system 20). The power request characterized by the power lever angle 1006 may be understood to be selectively variable between 0% and 100% of the power output of the propulsion system 20 (e.g., the thermal power of the engine 22 and the electrical power of the electric motor 62). The battery management system 68 may receive the power lever angle 1006 from the power throttle 1004.

During operation of the propulsion system 20 of FIG. 2, ambient air enters the propulsion system 20 through an air intake into and through a core flow path 88 of the engine 22. The ambient air flow along the core flow path 88 is compressed in the compressor section 30 and directed into the combustion chamber 42 of the combustor 40 within the combustor section 32. Fuel is injected into the combustion chamber 42 and mixed with the compressed air to provide a fuel-air mixture. This fuel-air mixture is ignited, and combustion products thereof flow through the high-pressure turbine section 34A and the power turbine section 34B, and are exhausted from the propulsion system 20. The bladed turbine rotor 54 and the bladed power turbine rotor 58 rotationally drive the first rotational assembly 44 and the second rotational assembly 46, respectively, in response to the combustion gas flow through the high-pressure turbine section 34A and the power turbine section 34B. The second rotational assembly 46 (e.g., the second shaft 56) may drive rotation of the propulsor 28, for example, through the gear box 60. The electric motor 62 may be selectively operated (e.g., electrically driven) to drive rotation of the propulsor 28 independently or in combination with the engine 22.

During operation of the propulsion system 20, the electric motor 62 may typically be deenergized during flight conditions having a relatively low-power lever angle 1006, for example, less than about 50%. During these flight conditions, the engine 22 may solely drive rotation of the propulsor 28. For flight conditions having a relatively high-power lever angle 1006, for example, greater than about 50%, the engine 22 and the electric motor 62 may cooperatively drive rotation of the propulsor 28. One possible failure mode for hybrid-electric propulsion system electric motors is an uncommanded rapid torque acceleration, for example, as a result of a command logic failure due to a hardware or software failure of a control system (e.g., a motor control unit (MCU) for the electric motor. During some flight conditions, such as a landing sequence, the occurrence of an uncommanded rapid torque acceleration may present significant difficulty for aircraft control as a pilot may not have sufficient time to react to the uncommanded rapid torque acceleration.

Figure 4:
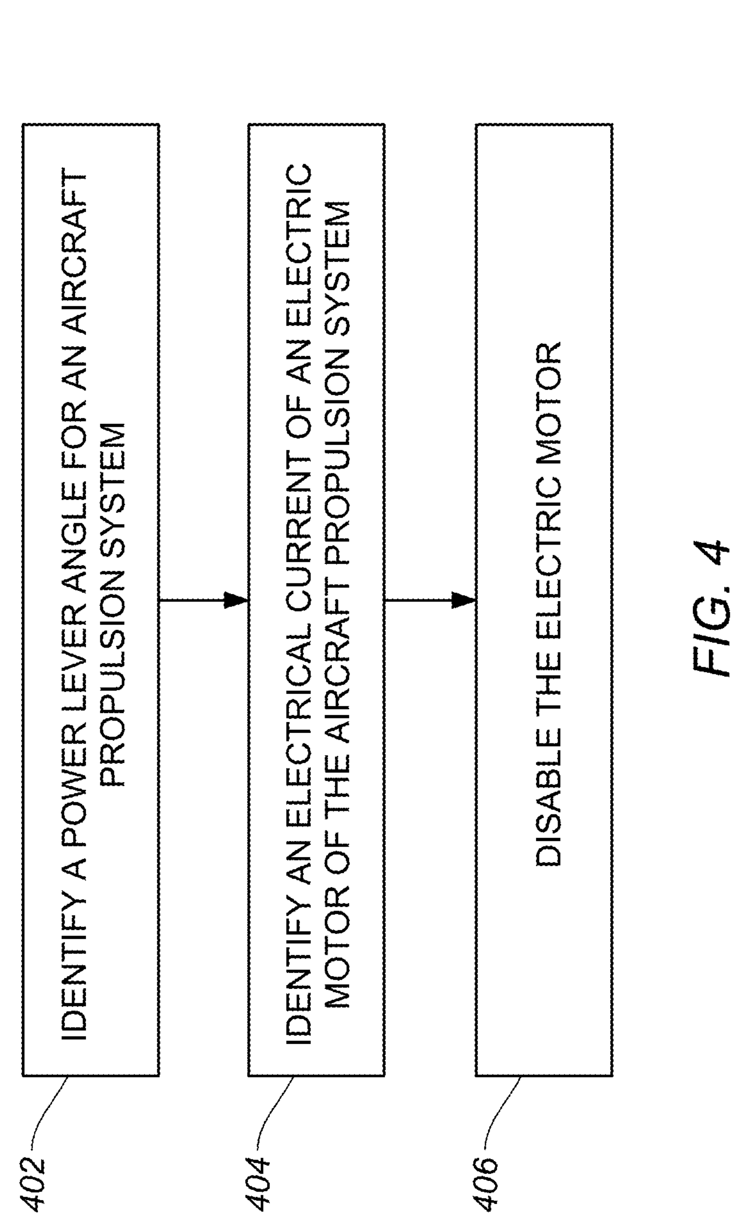
FIG. 4 illustrates a block diagram depicting a method for controlling an electric motor of an aircraft propulsion system, in accordance with one or more embodiments of the present disclosure.

Referring to FIGS. 2 and 4, a method 400 for controlling an electric motor for a hybrid-electric aircraft propulsion system to is provided. FIG. 4 illustrates a flowchart for the method 400. The method 400 may be performed for the propulsion system 20, as described herein. The battery management system 68 (e.g., the control unit 82) may be used to execute or control one or more steps of the method 400 for the propulsion system 20. For example, the processor 84 may execute instructions stored in memory 86, thereby causing the control unit 82 and/or its processor 84 to execute or otherwise control one or more steps of the method 400. Alternatively, the control unit 82 may be formed by another controller of the propulsion system 20 such as, but not limited to, electronic engine controller (EEC) for the engine 22. The EEC may control operating parameters of the engine 22 including, but not limited to, fuel flow, stator vane position (e.g., variable compressor inlet guide vane (IGV) position), compressor air bleed valve position, shaft (e.g., first shaft 50 and/or second shaft 56) torque and/or rotation speed, electric motor 62 torque and/or rotation speed, etc. so as to control an engine power or performance of the propulsion system 20. In some embodiments, the EEC may be part of a full authority digital engine control (FADEC) system for the engine 22. It should be understood, however, that the method 400 is not limited to use with the particular propulsion system 20 described herein. Unless otherwise noted herein, it should be understood that the steps of method 400 are not required to be performed in the specific sequence in which they are discussed below and, in some embodiments, the steps of method 400 may be performed separately or simultaneously.

In step 402, the control unit 82 identifies the power lever angle 1006 of the power throttle 1004 is greater than or less than a power threshold. A value of the power threshold is selected such that with the power lever angle 1006 below the power threshold the electric motor 62 is expected to be deenergized (e.g., not applying torque to the propulsor 28) and above the power threshold the electric motor 62 is expected to be energized (e.g., applying torque to the propulsor 28). For example, the power threshold may be between 40% and 60% of the power lever angle 1006 or, more particularly, approximately 50% of the power lever angle 1006. The present disclosure, however, is not limited to any particular value of the power threshold.

In step 404, the control unit 82 identifies an electrical current supplied to the electric motor 62 is greater than or less than an electrical current threshold, in response to identifying the power lever angle 1006 is less than the power threshold (see step 402). The control unit 82 may identify a value of the electric current, for example, using the current sensor 80. Routine experimentation and/or analysis may be performed by one of ordinary skill in the art to select a value of the electrical current threshold suitable for identifying an uncommanded operation (e.g., energization) of the electric motor 62, in accordance with and as informed by one or more aspects of the present disclosure.

Step 406 includes disabling the electric motor 62 in response to identifying the electrical current supplied to the electric motor 62 is greater than the electrical current threshold. The control unit 82 may disable the electric motor 62 by commanding the electric motor 62 (e.g., a motor control unit (MCU) of the electric motor 62) to deenergize the electric motor 62. Additionally or alternatively, the control unit 82 may disable the electric motor 62 by controlling the contactor 72 to the open condition to electrically isolate the electric motor 62 from electric power supplied from the electrical distribution system 66.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A propulsion system for an aircraft, the propulsion system comprising:

a propulsor;

an engine including a rotational assembly configured for rotation about a rotational axis of the engine, and the rotational assembly is coupled to the propulsor;

an electrical assembly including an electric motor, an electrical distribution system, and an electrical current sensor, the electric motor is coupled to the propulsor, the electric motor is electrically connected to the electrical distribution system, the electrical current sensor is configured to measure an electrical current supplied to the electric motor by the electrical distribution system; and a control unit including a processor connected in signal communication with a non-transitory memory including instructions which, when executed by the processor, cause the processor to:

identify a power lever angle of a power throttle for the propulsion system is greater than or less than a power threshold;

identify the electrical current is greater than or less than an electrical current threshold in response to identifying the power lever angle is less than the power threshold; and disable the electric motor in response to identifying the electrical current is greater than the electrical current threshold.

2. The propulsion system of claim 1, wherein the control unit is connected in signal communication with the electric motor, and disabling the electric motor includes commanding the electric motor, with the control unit, to deenergize the electric motor.

3. The propulsion system of claim 1, wherein disabling the electric motor includes controlling the electrical distribution system, with the control unit, to electrically isolate the electric motor.

4. The propulsion system of claim 3, wherein the electrical distribution system includes a contactor connected in signal communication with the control unit, the contactor is configurable in a closed condition or an open condition, in the closed condition the contactor is configured to supply electrical power to the electric motor from the electrical distribution system, in the open condition the contactor is configured to electrically isolate the electric motor from the electrical distribution system, and controlling the electrical distribution system to electrically isolate the electric motor includes controlling the contactor, with the control unit, from the closed condition to the open condition.

5. The propulsion system of claim 1, wherein the electrical assembly includes a battery, and the battery is electrically connected to the electric motor by the electrical distribution system.

6. The propulsion system of claim 5, wherein the electrical assembly includes a battery management system for the battery, and the battery management system includes the control unit.

7. The propulsion system of claim 6, wherein the battery management system includes a battery sensor assembly for the battery, and the control unit is connected in signal communication with the battery sensor assembly.

8. The propulsion system of claim 1, wherein the propulsion system includes a gear box coupling the propulsor to the rotational assembly and the electric motor.

9. A method for controlling an electric motor of a propulsion system for an aircraft, the method comprising:

driving rotation of a propulsor with an engine of the propulsion system in response to a power lever angle of a power throttle for the propulsion system;

identifying, with a control unit, the power lever angle less than a power threshold;

identifying, with the control unit, an electrical current supplied to an electric motor of the propulsion system from an electrical distribution system is greater than an electrical current threshold in response to identifying the power lever angle is less than the power threshold, and the electric motor is coupled to the propulsor; and disabling, with the control unit, the electric motor in response to identifying the electrical current is greater than the electrical current threshold.

10. The method of claim 9, wherein disabling the electric motor includes commanding the electric motor, with the control unit, to deenergize the electric motor.

11. The method of claim 9, wherein disabling the electric motor includes controlling the electrical distribution system, with the control unit, to electrically isolate the electric motor.

12. The method of claim 11, wherein the electrical distribution system includes a contactor connected in signal communication with the control unit, the contactor is configurable in a closed condition or an open condition, in the closed condition the contactor is configured to supply electrical power to the electric motor from the electrical distribution system, in the open condition the contactor is configured to electrically isolate the electric motor from the electrical distribution system, and controlling the electrical distribution system to electrically isolate the electric motor includes controlling the contactor, with the control unit, from the closed condition to the open condition.

13. The method of claim 9, wherein the steps of identifying the power lever angle is less than the power threshold, identifying the electrical current supplied to the electric motor is greater than the electrical current threshold, and disabling the electric motor are performed while driving rotation of the propulsor with the engine.

14. The method of claim 9, wherein the steps of identifying the power lever angle is less than the power threshold, identifying the electrical current supplied to the electric motor is greater than the electrical current threshold, and disabling the electric motor are performed during a landing sequence of the aircraft.

15. A propulsion system for an aircraft, the propulsion system comprising:

a propulsor;

an engine including a rotational assembly configured for rotation about a rotational axis of the engine, and the rotational assembly is coupled to the propulsor; and an electrical assembly including an electric motor, an electrical distribution system, a battery, a battery management system, and an electrical current sensor, the electric motor is coupled to the propulsor, the electric motor and the battery are electrically connected to the electrical distribution system, the electrical current sensor is configured to measure an electrical current supplied to the electric motor by the electrical distribution system, the battery management system includes a battery sensor assembly for the battery, and the battery management system further includes a processor connected in signal communication with a non-transitory memory including instructions which, when executed by the processor, cause the processor to:

identify a power lever angle of a power throttle for the propulsion system is greater than or less than a power threshold;

identify the electrical current is greater than or less than an electrical current threshold in response to identifying the power lever angle is less than the power threshold; and disable the electric motor in response to identifying the electrical current is greater than the electrical current threshold.

16. The propulsion system of claim 15, wherein the battery management system is connected in signal communication with the electric motor, and disabling the electric motor includes commanding the electric motor, with the battery management system, to deenergize the electric motor.

17. The propulsion system of claim 15, wherein disabling the electric motor includes controlling the electrical distribution system, with the battery management system, to electrically isolate the electric motor.

18. The propulsion system of claim 17, wherein the electrical distribution system includes a contactor connected in signal communication with the battery management system, the contactor is configurable in a closed condition or an open condition, in the closed condition the contactor is configured to supply electrical power to the electric motor from the electrical distribution system, in the open condition the contactor is configured to electrically isolate the electric motor from the electrical distribution system, and controlling the electrical distribution system to electrically isolate the electric motor includes controlling the contactor, with the battery management system, from the closed condition to the open condition.

19. The propulsion system of claim 15, wherein the propulsion system includes a gear box coupling the propulsor to the rotational assembly and the electric motor.

* * * * *